(12) United States Patent
Seong

(10) Patent No.: US 10,651,499 B2
(45) Date of Patent: May 12, 2020

(54) SECONDARY BATTERY

(71) Applicant: SAMSUNG SDI CO., LTD., Yongin-si, Gyeonggi-do (KR)

(72) Inventor: Jaeil Seong, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 0 days.

(21) Appl. No.: 15/437,842

(22) Filed: Feb. 21, 2017

(65) Prior Publication Data

US 2017/0244129 A1 Aug. 24, 2017

(30) Foreign Application Priority Data

Feb. 22, 2016 (KR) .................. 10-2016-0020672

(51) Int. Cl.
*H01M 10/04* (2006.01)
*H01M 2/02* (2006.01)
*H01M 10/0525* (2010.01)
*H01M 10/0587* (2010.01)

(52) U.S. Cl.
CPC ..... *H01M 10/0468* (2013.01); *H01M 2/0275* (2013.01); *H01M 2/0287* (2013.01); *H01M 10/0431* (2013.01); *H01M 10/0525* (2013.01); *H01M 10/0587* (2013.01); *Y02T 10/7011* (2013.01)

(58) Field of Classification Search
CPC ........... H01M 2/0275; H01M 10/0431; H01M 10/0587
See application file for complete search history.

(56) References Cited

U.S. PATENT DOCUMENTS 7,122,271 B2 10/2006 Kim et al.
8,288,036 B2 * 10/2012 Kim .................. H01M 10/0431
429/163
8,609,272 B2 12/2013 Park

FOREIGN PATENT DOCUMENTS

JP 2011-044436 A 3/2011
KR 10-2004-0066412 A 7/2004
KR 10-2010-0018281 A 2/2010

OTHER PUBLICATIONS

JP 2011044436—Translation (2011).*

* cited by examiner

*Primary Examiner* — Ladan Mohaddes
(74) *Attorney, Agent, or Firm* — Lee IP Law, PC

(57) ABSTRACT

A secondary battery includes an electrode assembly including a first electrode plate, a second electrode plate, and a separator provided between the first and second electrode plates, wrapping tape including a first surface and a second surface opposite to the first surface, the wrapping tape surrounding the electrode assembly, and having adhesive layers coated only on parts of the first surface, a can including an opening at a side thereof to insert the electrode assembly therethrough, the can accommodating the electrode assembly therein, and a cap assembly configured to close the opening of the can.

6 Claims, 3 Drawing Sheets

SECONDARY BATTERY

CROSS-REFERENCE TO RELATED APPLICATION

Korean Patent Application No. 10-2016-0020672, filed on Feb. 22, 2016, in the Korean Intellectual Property Office, and entitled: "Secondary Battery," is incorporated by reference herein in its entirety.

BACKGROUND

1. Field

One or more embodiments relate to a secondary battery.

2. Description of the Related Art

In general, unlike non-rechargeable primary batteries, secondary batteries are rechargeable. The secondary batteries are used as energy sources in mobile devices, electric vehicles, hybrid electric vehicles, electric bikes, uninterruptible power supplies, etc. A single battery or a battery module of multiple batteries electrically connected to each other into a unit may be used depending on the type of an external device.

SUMMARY

Embodiments are directed to a secondary battery including an electrode assembly including a first electrode plate, a second electrode plate, and a separator provided between the first and second electrode plates, wrapping tape including a first surface and a second surface opposite to the first surface, the wrapping tape surrounding the electrode assembly, and having adhesive layers coated only on parts of the first surface, a can including an opening at a side thereof to insert the electrode assembly therethrough, the can accommodating the electrode assembly therein, and a cap assembly configured to close the opening of the can.

The first surface of the wrapping tape may contact the electrode assembly.

The electrode assembly may be wound around a winding axis.

The can may include a bottom surface and side walls perpendicularly extending from the bottom surface. The winding axis of the electrode assembly may be parallel or perpendicular to the bottom surface.

The wrapping tape may be adhered to surround the electrode assembly in a direction equal to a winding direction of the electrode assembly.

The adhesive layers may include a first adhesive surface and a second adhesive surface. The wrapping tape may include a first end and a second end that meet each other when the wrapping tape is wound. The first adhesive surface may include the first end. The second adhesive surface may include the second end.

The adhesive layers may further include a third adhesive surface between the first and second adhesive surfaces on the first surface of the wrapping tape.

The adhesive layers of the wrapping tape may be coated in a direction parallel to the winding axis of the electrode assembly to have a form of straight lines having a certain width.

An area on which the adhesive layers are coated may be equal to or greater than 20% and equal to or less than 40% of a total area of the wrapping tape.

A material of the wrapping tape may include polyethylene (PE), polyphenylene ether (PPE), polyimide (PI), polypropylene (PP), or polyethylene terephthalate (PET).

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
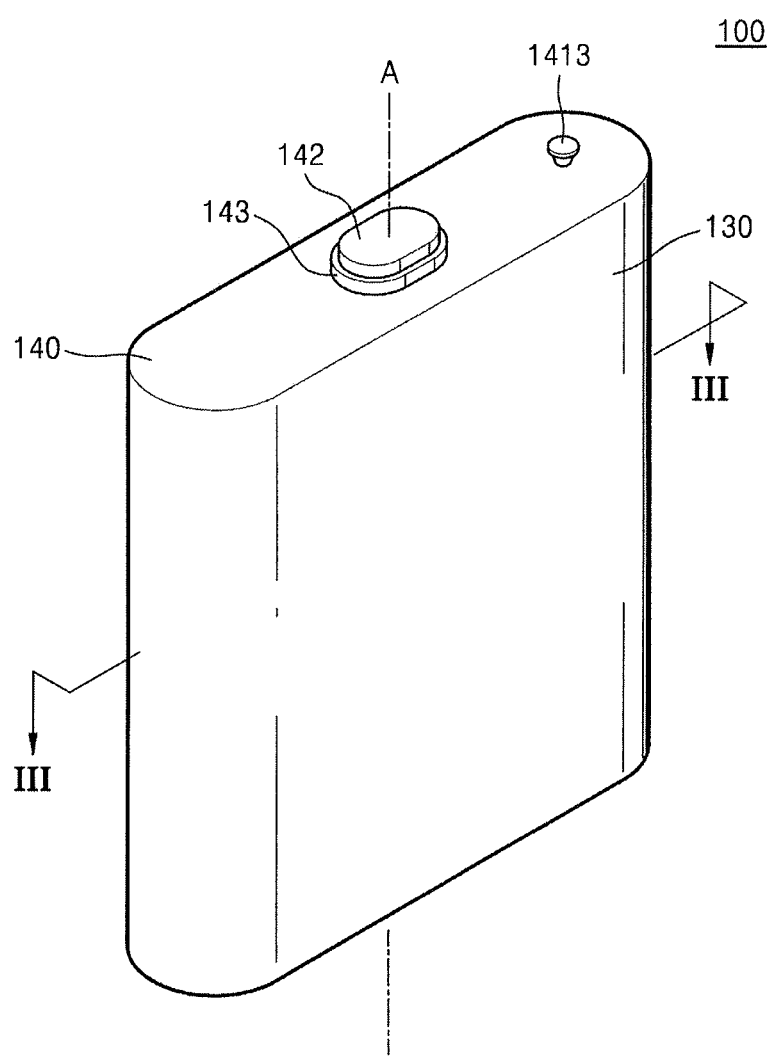
FIG. 1 illustrates a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
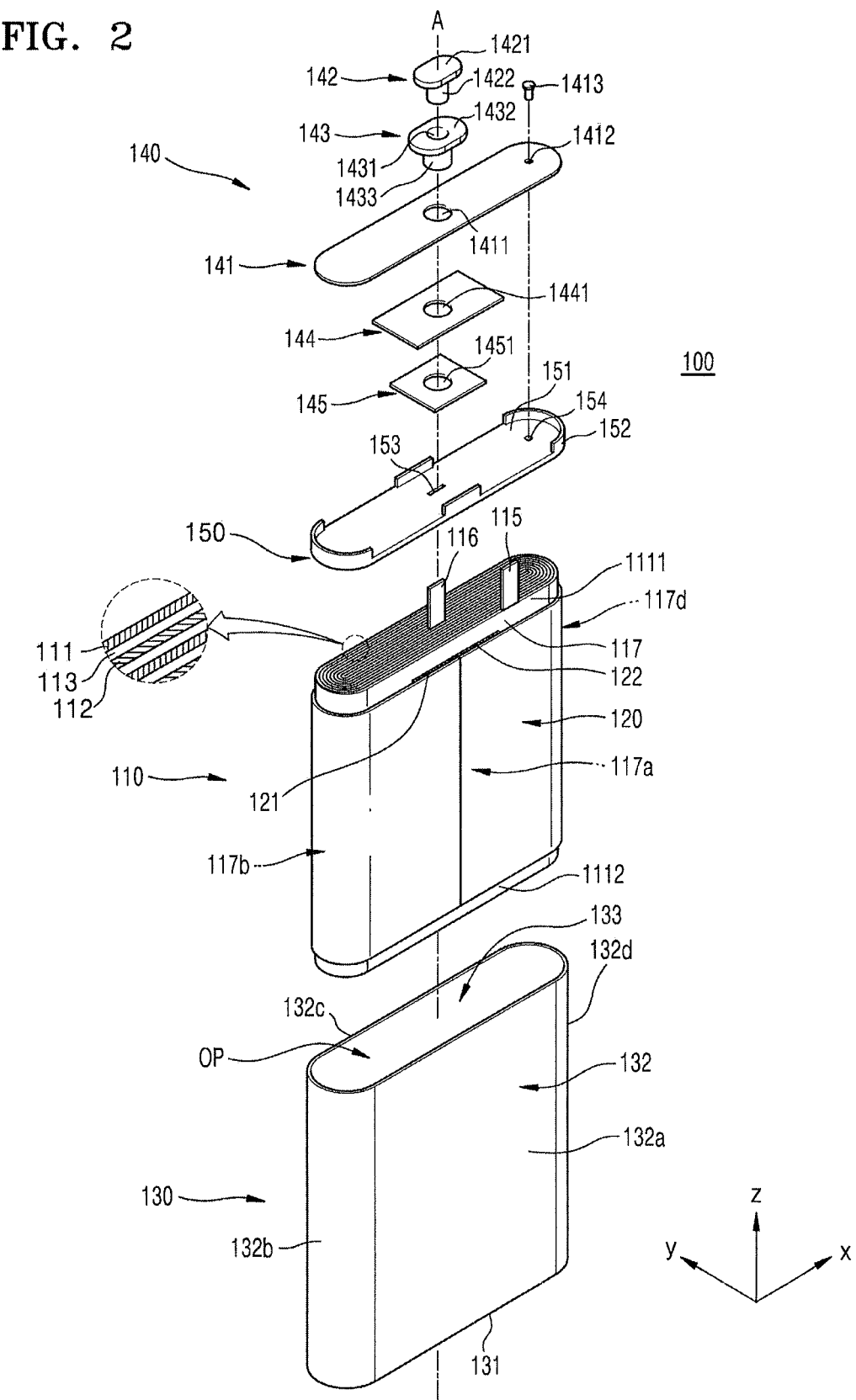
FIG. 2 illustrates an exploded perspective view of the secondary battery of FIG. 1.

FIG. 1 illustrates a perspective view of a secondary battery 100 according to an embodiment, and FIG. 2 illustrates an exploded perspective view of the secondary battery 100 of FIG. 1.

Referring to FIGS. 1 and 2, the secondary battery 100 may include an electrode assembly 110, wrapping tape 120 surrounding the electrode assembly 110, a can 130 accommodating the electrode assembly 110 therein, and a cap assembly 140. The secondary battery 100 according to an embodiment is rechargeable and may be a lithium-ion battery.

The electrode assembly 110 may include a first electrode plate 111 serving as a positive electrode plate, a second electrode plate 112 serving as a negative electrode plate, a separator 113, a positive electrode tap 115 serving as a first electrode tap, and a negative electrode tap 116 serving as a second electrode tap. The electrode assembly 110 may be wound in such a manner that the two electrode plates 111 and 112 and the separator 113 are provided in an alternate manner. In the electrode assembly 110, the positive electrode plate 111, the separator 113, and the negative electrode plate 112 may be sequentially and repeatedly provided in a direction from outside to inside.

The electrode assembly 110 may be pressed from an outer surface 117 thereof and thus may have a flat plate shape, as illustrated in FIGS. 1 and 2. The electrode assembly 110 may be wound around a winding axis A. The outer surface 117 of the electrode assembly 110 may include a front surface 117a, a first side surface 117b, a rear surface 117c, and a second side surface 117d provided along a winding direction. The front and rear surfaces 117a and 117c may be flat surfaces having a width greater than that of the first and second side surfaces 117b and 117d. The first and second side surfaces 117b and 117d may be vertically convex and curved surfaces interconnecting the front and rear surfaces 117a and 117c. The wrapping tape 120 to be described below may be adhered onto the outer surface 117 of the electrode assembly 110 to prevent the two electrode plates 111 and 112 and the separator 113 from becoming unwound. The thickness of the two electrode plates 111 and 112 and the separator 113 is magnified in FIG. 2 for convenience of explanation. The two electrode plates 111 and 112 and the separator 113 may be provided as thin films having much smaller thicknesses.

The positive electrode plate 111 may include a positive electrode current collector and a positive electrode active material layer. For example, the positive electrode current collector may be provided as a conductive metal film such as an aluminum film. The positive electrode active material layer may include a layered compound including lithium, a conductive material for improving conductivity, and a binder for improving a binding force between the layered compound and the conductive material. The positive electrode active material layer may be coated on a wide surface of the positive electrode current collector to be bonded to the positive electrode current collector. The positive electrode tap 115 may be attached to the positive electrode current collector and may extend upwardly from the electrode assembly 110.

The negative electrode plate 112 may include a negative electrode current collector and a negative electrode active material layer. For example, the negative electrode current collector may be provided as a conductive metal film such as a copper film. The negative electrode active material layer may include carbon, e.g., graphite containing carbon, and a binder for improving a binding force of carbon particles. The negative electrode active material layer may be coated on a wide surface of the negative electrode current collector to be bonded to the negative electrode current collector. The negative electrode tap 116 may be attached to the negative electrode current collector and extend upwardly from the electrode assembly 110.

The separator 113 may be provided between the positive and negative electrode plates 111 and 112 to insulate the positive and negative electrode plates 111 and 112 from each other. In addition, micropores may be provided in the separator 113 and lithium ions may pass through the micropores between the positive and negative electrode plates 111 and 112. The separator 113 may be made of, for example, a polymer resin such as polyethylene (PE) or polypropylene (PP).

The positive electrode tap 115 may be attached to the positive electrode current collector of the positive electrode plate 111 through welding, such as ultrasonic welding or resistance welding, and may extend upwardly from the electrode assembly 110. In addition, the positive electrode tap 115 may be electrically connected to a cap plate 141 of the cap assembly 140 and the can 130 to be described below. The positive electrode tap 115 may be made of, for example, a conductive metal such as nickel, copper, or aluminum.

The negative electrode tap 116 may be attached to the negative electrode current collector of the negative electrode plate 112 through welding, such as ultrasonic welding or resistance welding, and may extend upwardly from the electrode assembly 110. In addition, the negative electrode tap 116 may be electrically connected to an electrode terminal 142 of the cap assembly 140 to be described below. The negative electrode tap 116 may be made of, for example, a conductive metal such as nickel, copper, or aluminum.

The above-described electrode assembly 110 may be wound around the winding axis A. The winding axis A of the electrode assembly 110 may be parallel or perpendicular to a bottom surface 131 of the can 130. The winding axis A of the electrode assembly 110 may be provided in a direction perpendicular to the bottom surface 131 of the can 130 (z direction) in FIG. 2. In some implementations, the winding axis A of the electrode assembly 110 may be provided in a direction parallel to the bottom surface 131 of the can 130 (x direction).

The wrapping tape 120 may include a first surface 120a (see FIG. 4) contacting the electrode assembly 110, and a second surface 120b (see FIG. 4) opposite to the first surface 120a. The wrapping tape 120 may have a thin plate shape and may be wound along the winding direction of the electrode assembly 110. The wrapping tape 120 may be adhered to surround the outer surface 117 of the electrode assembly 110. Accordingly, the wrapping tape 120 may maintain the electrode assembly 110 in the wound state. In addition, the wrapping tape 120 may contact the insides of side walls 132 of the can 130 to be described below to protect the electrode assembly 110 in the can 130.

The wrapping tape 120 may contact an electrolyte in the can 130, and thus may be made of a material that is resistant to the electrolyte. The wrapping tape 120 may be made of, for example, polyethylene (PE), polyphenylene ether (PPE), polyimide (PI), polypropylene (PP), or polyethylene terephthalate (PET).

The can 130 may include an opening OP provided at a side thereof, and the electrode assembly 110 may be inserted into the can 130 through the opening OP. At a side opposite to the opening OP, the can 130 may include the bottom surface 131 extending in a direction, and the side walls 132 perpendicularly extending from the bottom surface 131. The side walls 132 may include a first wide side wall 132a, a first narrow side wall 132b, a second wide side wall 132c, and a second narrow side wall 132d. The first and second wide side walls 132a and 132c may face each other, and the first and second narrow side walls 132b and 132d may face each other. The two wide side walls 132a and 132c may have a width greater than that of the two narrow side walls 132b and 132d. The two wide side walls 132a and 132c may be flat panels extending in parallel to each other. The two narrow side walls 132b and 132d may be curved in such a manner that the distance therebetween is increased toward vertical centerlines thereof. For example, the narrow side walls 132b and 132d may be vertically convex. The can 130 may be made of, for example, a conductive metal such as aluminum.

The cap assembly 140 may include the cap plate 141, the electrode terminal 142, an insulating gasket 143, an insulating plate 144, and a terminal plate 145. The cap plate 141 may have a plate shape corresponding to the opening OP of the can 130. The cap plate 141 may be bonded to the can 130 to close the opening OP of the can 130. Contacting parts between the cap plate 141 and the opening OP of the can 130 may be bonded through welding such as laser welding.

The cap plate 141 may include an electrode terminal hole 1411 located at a center part thereof, and an electrolyte injection hole 1412 located near an end part thereof. The insulating gasket 143 may be inserted into the electrode terminal hole 1411. The electrolyte is injected through the electrolyte injection hole 1412. The electrolyte injection hole 1412 may be closed by a plug 1413 after the electrolyte is injected therethrough. The plug 1413 may be sealed on the cap plate 141 through laser welding or the like. The cap plate 141 may be made of a conductive metal such as aluminum or an alloy including aluminum.

The electrode terminal 142 may include a head part 1421 and a connection part 1422 extending from the head part 1421. The head part 1421 may have a size greater than that of an insertion hole 1431 of the insulating gasket 143, such that the head part 1421 may not pass through the insertion hole 1431. The head part 1421 may be located on a head part 1432 of the insulating gasket 143. The connection part 1422 may extend to reach the terminal plate 145 through the insertion hole 1431 of the insulating gasket 143. The electrode terminal 142 may be made of, for example, a conductive metal such as nickel or an alloy including nickel.

The insulating gasket 143 may include the head part 1432 and an extension part 1433 extending from the head part 1432. The insulating gasket 143 may include the insertion hole 1431 passing through the center of the insulating gasket 143 along a direction in which the extension part 1433 extends. The head part 1432 may have a size greater than that of the electrode terminal hole 1411 of the cap plate 141 such that the head part 1432 may not pass through the electrode terminal hole 1411. The extension part 1433 may be inserted and fitted into the electrode terminal hole 1411 of the cap plate 141. The connection part 1422 of the electrode terminal 142 to be described below may pass through the insertion hole 1431. The insulating gasket 143 may be made of an insulating material such as a polymer resin to insulate the electrode terminal 142 and the cap plate 141 from each other.

The insulating plate 144 may have a plate shape and may include a first hole 1441 located at a center part thereof. The connection part 1422 of the electrode terminal 142 may pass through the first hole 1441. The insulating plate 144 may be located under the cap plate 141. The insulating plate 144 may insulate the terminal plate 145 from the cap plate 141. The insulating plate 144 may be made of a polymer resin.

The terminal plate 145 may have a plate shape smaller than the insulating plate 144. The terminal plate 145 may include a second hole 1451 located at a center part thereof. The connection part 1422 of the electrode terminal 142 may pass through the second hole 1451. After the connection part 1422 of the electrode terminal 142 passes through the second hole 1451 of the terminal plate 145, an end of the connection part 1422 may be compressed to a diameter greater than that of the second hole 1451. Thus, the cap assembly 140 may be completely assembled. The terminal plate 145 may be formed of a conductive metal such as nickel or an alloy including nickel. The terminal plate 145 may be electrically connected to the negative electrode tap 116 of the electrode assembly 110.

An insulating case 150 may be located between the cap assembly 140 and the electrode assembly 110. The insulating case 150 may be made of an insulating material such as a polymer resin, and may include a bottom plate 151 and side walls 152 extending from the bottom plate 151. The bottom plate 151 may be located on the electrode assembly 110 in an internal space 133 of the can 130. The bottom plate 151 may have a shape corresponding to the opening OP of the can 130. The bottom plate 151 may include a first slit 153, a second slit, and an electrolyte hole 154. The negative electrode tap 116 of the electrode assembly 110 may be electrically connected to the electrode terminal 142 of the cap assembly 140 through the first slit 153. The positive electrode tap 115 of the electrode assembly 110 may be electrically connected to the cap plate 141 of the cap assembly 140 through the second slit. The side walls 152 may extend from edges of the bottom plate 151 and may contact internal walls of the can 130. The side walls 152 may reinforce the strength of the bottom plate 151 and may prevent the insulating case 150 from moving in the can 130.

Figure 3:
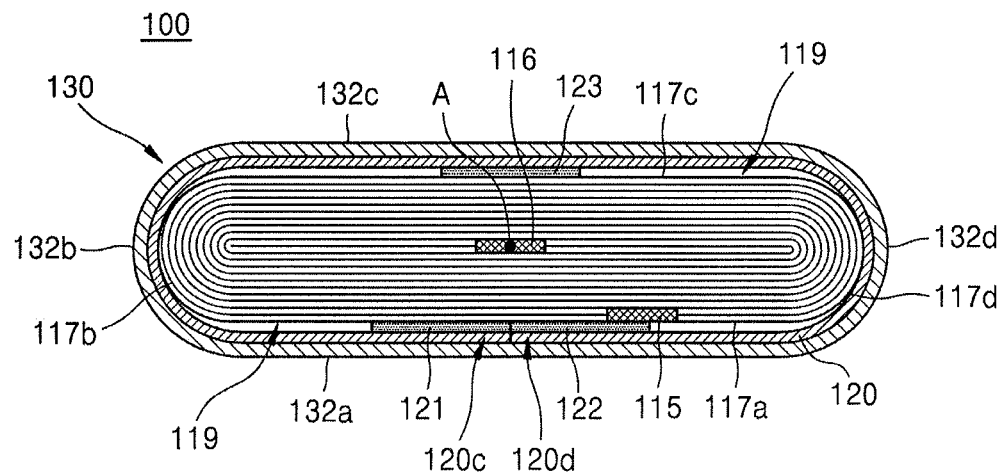
FIG. 3 illustrates a plan view taken along line of the secondary battery of FIG. 1.
Figure 4:
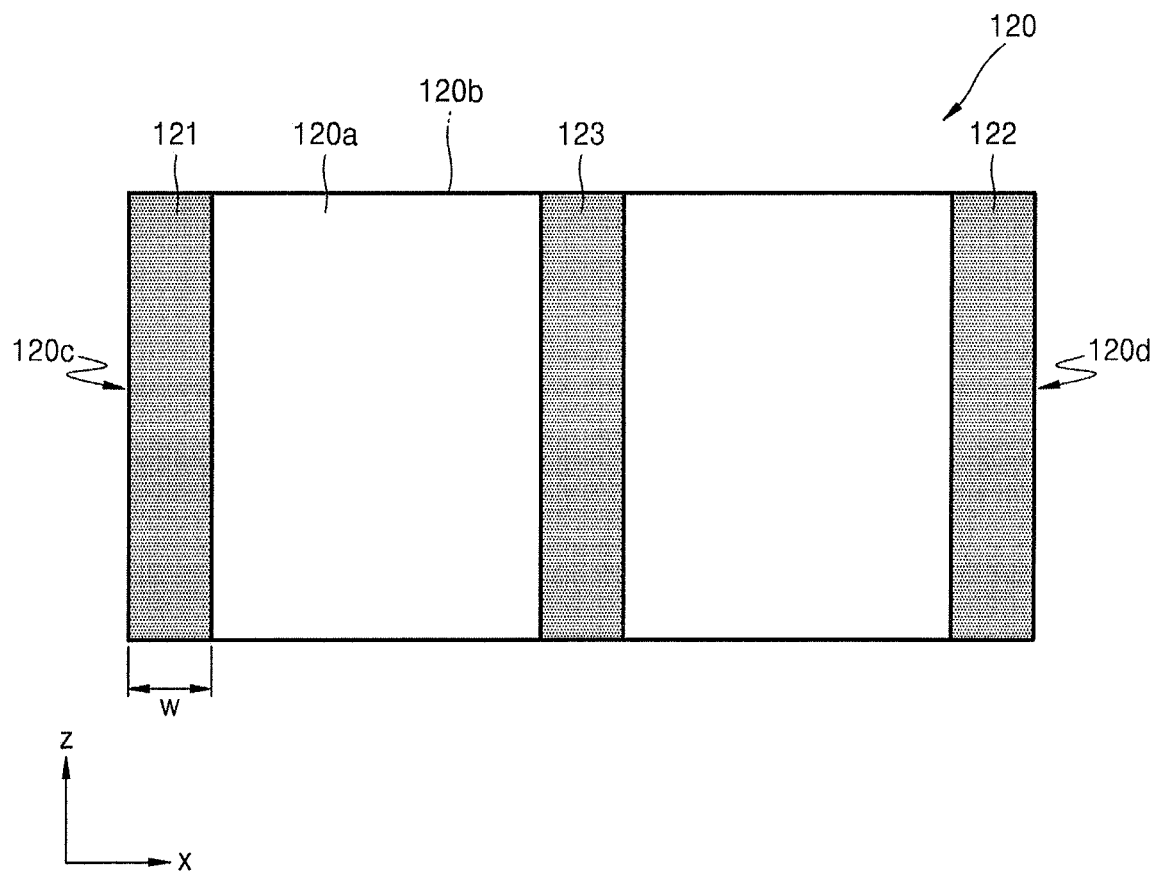
FIG. 4 illustrates a plan view of wrapping tape of FIG. 1.

FIG. 3 illustrates a plan view taken along line of the secondary battery 100 of FIG. 1, and FIG. 4 illustrates a plan view of the wrapping tape 120 of FIG. 2 in an unwound state. The structure and function of the wrapping tape 120 surrounding the electrode assembly 110 are now described in detail with reference to FIGS. 3 and 4.

Referring to FIGS. 3 and 4, the electrode assembly 110 may include the wrapping tape 120 surrounding the outer surface 117 of the electrode assembly 110. The wrapping tape 120 may have a thin plate shape and may be wound along the winding direction of the electrode assembly 110. The wrapping tape 120 may be adhered to surround the outer surface 117 of the electrode assembly 110. Accordingly, the wrapping tape 120 may maintain the electrode assembly 110 in the wound state. In addition, the wrapping tape 120 may contact the insides of the side walls 132 of the can 130 to protect the electrode assembly 110 in the can 130.

The wrapping tape 120 may include the first surface 120a and the second surface 120b opposite to the first surface 120a. The first surface 120a of the wrapping tape 120 may contact the electrode assembly 110, and the second surface 120b of the wrapping tape 120 may contact the inside of the can 130. Adhesive layers 121, 122, and 123 may be coated only on parts of the first surface 120a of the wrapping tape 120 contacting the electrode assembly 110. For example, the adhesive layers 121, 122, and 123 may not be coated on the second surface 120b of the wrapping tape 120 or on the other parts of the first surface 120a of the wrapping tape 120.

If the adhesive layers 121, 122, and 123 were to be coated on the entire first surface 120a of the wrapping tape 120, the adhesive layers 121, 122, and 123 of the wrapping tape 120 could forcibly suppress an expansive force of the electrode assembly 110. As such, the electrode assembly 110 of which expansion is suppressed could be bent toward the inside thereof where the positive electrode tap 115 and/or the negative electrode tap 116 is provided, and thus could undergo internal deformation. If internal deformation of the electrode assembly 110 were to occur, the thickness of the secondary battery 100 might not be easily controllable and the life of the secondary battery 100 might be reduced.

In the secondary battery 100 according to an embodiment, the adhesive layers 121, 122, and 123 are coated only on parts of the first surface 120a of the wrapping tape 120. Accordingly, the adhesive force between the wrapping tape 120 and the electrode assembly 110 may be flexible. If the adhesive force between the wrapping tape 120 and the electrode assembly 110 is flexible, a force received by the wrapping tape 120 when the electrode assembly 110 expands may be appropriately controlled, and thus, internal deformation of the electrode assembly 110 may be reduced or prevented. In addition, when internal deformation of the electrode assembly 110 is reduced or prevented, the thickness of the secondary battery 100 may be easily controlled, and the life of the secondary battery 100 may be increased.

FIG. 4 illustrates the first surface 120a of the wrapping tape 120. The adhesive layers 121, 122, and 123 may be coated in a direction (z direction) to have a form of straight lines having a certain width w. The description that the adhesive layers 121, 122, and 123 are coated in a direction may indicate that the adhesive layers 121, 122, and 123 are coated in a direction parallel to the winding axis A of the electrode assembly 110. When the adhesive layers 121, 122, and 123 are coated in a direction parallel to the winding axis A of the electrode assembly 110, a force received by the wrapping tape 120 when the electrode assembly 110 expands may be appropriately controlled.

The adhesive layers 121, 122, and 123 may include a first adhesive surface 121 and a second adhesive surface 122 provided on the first surface 120a of the wrapping tape 120. The wrapping tape 120 may include a first end 120c and a second end 120d which meet each other when the wrapping tape 120 is wound to surround the electrode assembly 110. As described above, the adhesive layers 121, 122, and 123 may be provided on only parts of the first surface 120a of the wrapping tape 120. The first adhesive surface 121 of the adhesive layers 121, 122, and 123 may include the first end 120c, and the second adhesive surface 122 may include the second end 120d. The first and second adhesive surfaces 121 and 122 including the first and second ends 120c and 120d of the wrapping tape 120 may be coated with adhesive layers to fix the wrapping tape 120 onto the electrode assembly 110. The adhesive layers 121, 122, and 123 may further include a third adhesive surface 123 provided between the first and second adhesive surfaces 121 and 122 on the first surface 120a of the wrapping tape 120. The third adhesive surface 123 may be provided in the middle of a region between the first and second adhesive surfaces 121 and 122 to reinforce the adhesive force of the wrapping tape 120.

When the adhesive layers 121, 122, and 123 are spaced apart from each other, spaces 119 may be generated among the adhesive layers 121, 122, and 123. The spaces 119 may be generated between the electrode assembly 110 and the wrapping tape 120. The spaces 119 may extend from a top part 1111 (see FIG. 2) to a bottom part 1112 (see FIG. 2) of the electrode assembly 110 to have a form of straight lines. When the electrolyte is injected, the electrolyte may move into the spaces 119. The electrolyte filled in the spaces 119 may weaken the adhesive force of the adhesive layers 121, 122, and 123.

An area of the first surface 120a of the wrapping tape 120 on which the adhesive layers 121, 122, and 123 are coated may be equal to or greater than 20% and equal to or less than 40% of a total area of the wrapping tape 120. For example, the area of the first surface 120a of the wrapping tape 120 on which the adhesive layers 121, 122, and 123 are coated may be 30% of the total area of the wrapping tape 120. The adhesive layers 121, 122, and 123 may be coated onto an area equal to or less than a predetermined area to achieve a flexible adhesive force of the wrapping tape 120 and, at the same time, may be coated onto an area equal to or more than another predetermined area to ensure the function of the wrapping tape 120 for surrounding the electrode assembly 110.

In the secondary battery 100 according to an embodiment, when the adhesive layers 121, 122, and 123 are coated on only parts of the first surface 120a of the wrapping tape 120, the adhesive force between the wrapping tape 120 and the electrode assembly 110 may be flexible. If the adhesive force between the wrapping tape 120 and the electrode assembly 110 is flexible, a force received by the wrapping tape 120 when the electrode assembly 110 expands may be appropriately controlled and thus internal deformation of the electrode assembly 110 may be reduced or prevented. In addition, when internal deformation of the electrode assembly 110 is reduced or prevented, the thickness of the secondary battery 100 may be easily controlled and the life of the secondary battery 100 may be increased.

By way of summation and review, according to one or more embodiments, a secondary battery having enhanced durability and stability may be implemented.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A secondary battery, comprising:
an electrode assembly including a first electrode plate, a second electrode plate, and a separator between the first and second electrode plates, the electrode assembly being wound around a winding axis;
a wrapping tape including a first surface facing the electrode assembly and a second surface opposite to the first surface, the wrapping tape including a first end and a second end, the wrapping tape being wound around the winding axis of the electrode assembly to completely surround the electrode assembly such that the first end and the second end meet each other when the wrapping tape is wound, and the wrapping tape having adhesive layers coated only on parts of the first surface such that other parts of the first surface of the wrapping tape do not have adhesive layers coated thereon, wherein the adhesive layers include a first adhesive layer on the first surface of the wrapping tape at the first end of the wrapping tape, a second adhesive layer on the first surface of the wrapping tape at the second end of the wrapping tape, and a third adhesive layer on the first surface of the wrapping tape between the first adhesive layer at the first end of the wrapping tape and the second adhesive layer on the first surface of the wrapping tape at the second end of the wrapping tape, wherein a portion of the other parts of the first surface of the wrapping tape that do not have adhesive layers coated thereon directly contact the electrode assembly;
a can including an opening at a side thereof to insert the electrode assembly therethrough, the can accommodating the electrode assembly therein; and
a cap assembly configured to close the opening of the can.

2. The secondary battery as claimed in claim 1, wherein:
the can includes a bottom surface and side walls perpendicularly extending from the bottom surface, and
the winding axis of the electrode assembly is parallel or perpendicular to the bottom surface.

3. The secondary battery as claimed in claim 1, wherein the adhesive layers of the wrapping tape are coated in a direction parallel to the winding axis of the electrode assembly to have a form of straight lines having a certain width.

4. The secondary battery as claimed in claim 1, wherein an area on which the adhesive layers are coated is equal to or greater than 20% and equal to or less than 40% of a total area of the wrapping tape.

5. The secondary battery as claimed in claim 1, wherein a material of the wrapping tape comprises polyethylene (PE), polyphenylene ether (PPE), polyimide (PI), polypropylene (PP), or polyethylene terephthalate (PET).

6. The secondary battery as claimed in claim 1, wherein, in parts of the first surface of the wrapping tape having adhesive layers thereon, the adhesive layers extend across an entire width of the wrapping tape in a direction parallel to the winding axis, and the other parts of the first surface of the wrapping tape that do not have adhesive layers coated thereon extend the entire width of the wrapping tape in the direction parallel to the winding axis.

* * * * *